E. H. OBERTOP.
PISTON RING FOR INTERNAL COMBUSTION ENGINES.
APPLICATION FILED NOV. 19, 1917.
1,293,617.  Patented Feb. 4, 1919.
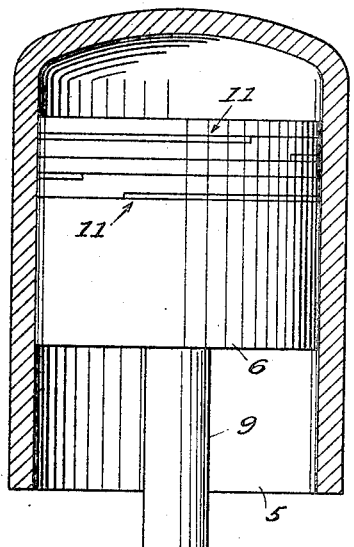
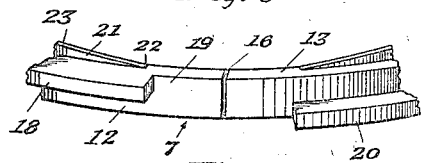
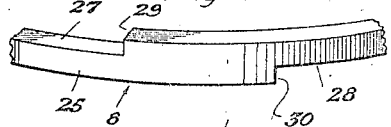
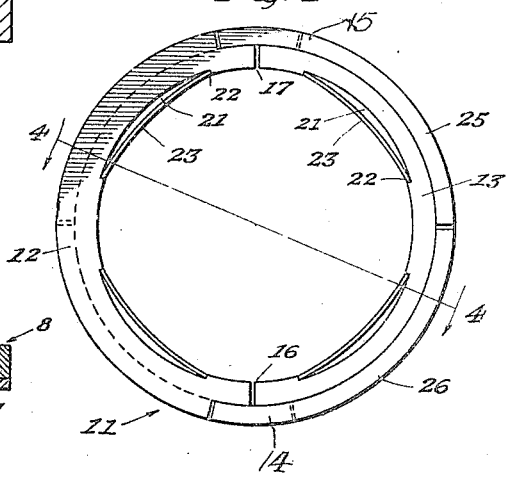
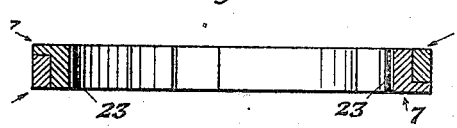
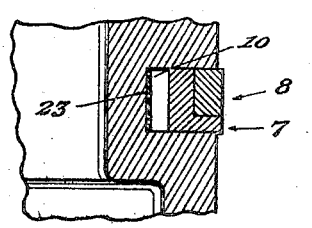
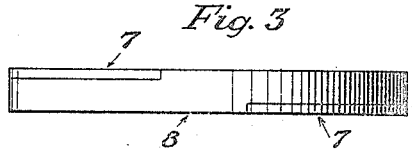
Inventor
Earl H. Obertop
by
Atty.

UNITED STATES PATENT OFFICE.

EARL H. OBERTOP, OF TONOPAH, NEVADA.

PISTON-RING FOR INTERNAL-COMBUSTION ENGINES.

1,293,617.  Specification of Letters Patent.  Patented Feb. 4, 1919.

Application filed November 19, 1917. Serial No. 202,856.

*To all whom it may concern:*

Be it known that I, EARL H. OBERTOP, a citizen of the United States, residing at Tonopah, county of Nye, State of Nevada, have invented new and useful Improvements in Piston-Rings for Internal-Combustion Engines, of which the following is a specification.

The present invention relates to improvements in packing rings for internal combustion engines of substantially the same type as illustrated and described in my Patent No. 1,179,333, issued April 11th, 1916, and a prime object thereof is to provide a segmental spring actuated packing ring that will perfectly equalize the expansion of the ring segments so that they will absolutely conform to the cylinder bores and prevent the escape or leakage of gases due to the compression or explosive stroke.

A further object of my invention is to provide a novel form of piston packing rings in which the expansible members may be readily inserted, and which may be readily removed therefrom when, for any cause, they are rendered inoperative.

A still further and important object of my invention is to provide a piston ring construction in which the segmental portions of the assembled ring when in place on a piston, will not move circumferentially, whereby to prevent a registration of the various joints of the ring during an operation of the piston and permitting a leakage of gases.

I accomplish the above objects by means of the device described herein and illustrated in the accompanying drawing, in which:

Figure 1 is a vertical section through an engine cylinder showing in side elevation a piston equipped with my resilient ring construction.

Fig. 2 is a plan view of my improved piston ring.

Fig. 3 is a side elevation of an assembled ring.

Fig. 4 is a section taken on line 4—4 of Fig. 2.

Fig. 5 is an enlarged detail of a fragmentary section of a piston, showing a sectional portion of a ring mounted in the piston groove.

Figs. 6 and 7 are detail perspective views of ring sections illustrating the positions of the sections relative to each other when assembled.

Referring to the drawing, 5 designates an engine cylinder of the usual type common to explosive engines, 6 a piston disposed therein provided with packing rings 7 and 8, and the usual piston rod 9. The rings are disposed in the annular peripheral grooves 10 on the surface of the piston. Rings 7 and 8 consist, as shown, of two halves 12, 13, and 14, 15, with spaces 16 and 17 between the abutting ends of the segments, thereby permitting expansion and contraction of the ring.

The segmental portion 12 of ring 7 is provided on its upper peripheral edge with a horizontally disposed flange 18, cut away as at 19 adjacent its ends, as clearly shown in Fig. 6 of the drawings. Its complemental segment 13 is similar in configuration to segmental portion 12, except that it is provided on its lower peripheral edge with a horizontally disposed flange 20 which is cut-away from the ends of the segment the same distance as the ends of flange 18 on segmental portion 12. The purposes and function of these flanges on the ring segments 12 and 13 will be more fully disclosed hereinafter.

The inner peripheral surface of each segmental portion of ring 7 is provided with a plurality of recessed portions 21, as clearly shown in the various figures of the drawing, and more particularly in Fig. 2; the vertically disposed walls of the recesses forming shoulders 22 against which the ends of the segmental spring members 23 bear, as clearly shown in Fig. 2 of the drawing. These recessed portions 21 correspond in depth to the thickness of the spring members 23 so that when the rings are in place in the peripheral grooves 10 of the piston they will snugly fit, the resiliency of the spring members 23 tending to force the segmental portions of rings 7 and 8 outwardly against the walls of the cylinder, and thus provide a gas-tight contact.

In the embodiment of my invention illustrated, I have shown each segment of the rings as being provided with two spring members 23, and this number may be varied as occasion demands. By oppositely disposing the spring members 22 as shown they will perfectly equalize the segmental portions of the ring segments so that they will conform closely to the cylinder bore as heretofore set forth.

Piston ring 8, as heretofore noted, is composed of two members 25 and 26, and each segmental portion is cut away on its upper and lower faces as at 27 and 28 so as to form abutting shoulders 29 and 30, the width between shoulders 29 and 30 equaling the space between the ends of flanges 18 and 20 on ring member 7, so when the two rings 7 and 8 are assembled as clearly shown in Figs. 2 and 3 of the drawing, they will present an apparently solid ring. By providing flanges having abutting ends on ring member 7 and providing the abutments on ring member 8, all movement of the segmental portions of the ring circumferentially will be prevented so that the joints between the segmental portions will never register, thus preventing any accidental leakage of gases when the engine is in operation.

It will be further noted that the ring can be easily assembled and will be held in its assembled position by virtue of its peculiar structure. The resilient segmental spring members 23 tend to force the segmental ring portions 12 and 13 outwardly and perfectly equalize the pressure thereon, while the segmental ring members 25 and 26 tend to hold the ring together and their abutments preventing any circumferential movement.

From the above it will be noted that I have produced a piston packing ring that will absolutely accommodate itself to any wear in the cylinder, whether it is worn simply larger and remains perfectly circular in section, or has worn into an irregular shape.

What I claim is:

1. A piston ring comprising a rigid annularly rabbeted ring composed of two like segments, a ring composed of two like resilient segments disposed in the rabbet of said rigid segmental ring, said rigid ring segments being provided with a plurality of recesses on its inner peripheral surface, and a resilient member disposed in each of said recesses.

2. A piston ring, comprising a ring composed of two complemental segments, abutments formed on the upper and lower edges of said segments adjacent their ends, and a ring composed of two segments provided on its upper and lower edges with abutments adapted to encompass said first named ring, the abutments of the second named ring engaging the abutments formed on the first named ring, whereby to prevent circumferential movement of the ring segments when assembled.

3. A piston ring, comprising a ring composed of two complemental segments, the inner peripheral surface of said ring being provided with a plurality of recesses, a resilient member disposed in each of said recesses, abutments formed on the upper and lower edges of said segments adjacent their ends, and a ring composed of two segments provided on its upper and lower edges with abutments adapted to encompass said first named ring, the abutments of the second named ring engaging the abutments formed on the first named ring, whereby to prevent circumferential movement of the ring segments when assembled.

In witness that I claim the foregoing I have hereunto subscribed my name this 1st day of November, 1917.

EARL H. OBERTOP.